Aug. 12, 1952     H. T. KRAFT     2,606,342
VULCANIZING APPARATUS FOR RETREADING TIRES
Filed Sept. 11, 1948     5 Sheets-Sheet 1

INVENTOR
*Herman T. Kraft*
BY *Evans & McCoy*
ATTORNEYS

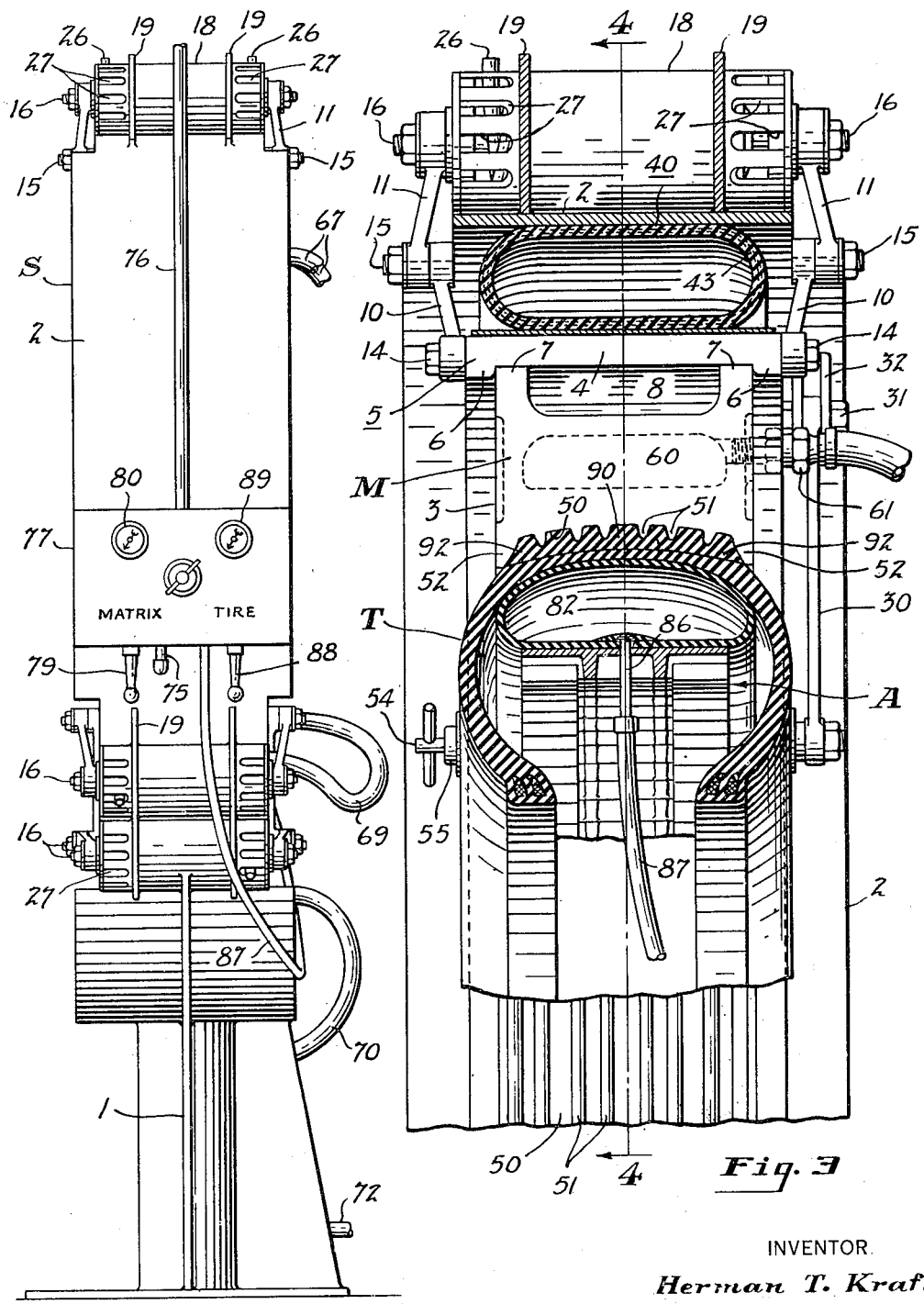

Aug. 12, 1952 H. T. KRAFT 2,606,342
VULCANIZING APPARATUS FOR RETREADING TIRES
Filed Sept. 11, 1948 5 Sheets-Sheet 3

INVENTOR
Herman T. Kraft
BY Evans & McCoy
ATTORNEYS

Aug. 12, 1952     H. T. KRAFT     2,606,342
VULCANIZING APPARATUS FOR RETREADING TIRES
Filed Sept. 11, 1948     5 Sheets—Sheet 5

INVENTOR
*Herman T. Kraft*
BY *Evans + McCoy*
ATTORNEYS

Patented Aug. 12, 1952

2,606,342

UNITED STATES PATENT OFFICE 2,606,342

VULCANIZING APPARATUS FOR RETREADING TIRES

Herman T. Kraft, Akron, Ohio, assignor to The General Tire and Rubber Company, Akron, Ohio, a corporation of Ohio Application September 11, 1948, Serial No. 48,841

38 Claims. (Cl. 18—18)

This invention relates to tire vulcanizing apparatus, more particularly to apparatus of the so-called "full circle" type for use in retreading or recapping pneumatic vehicle tires.

It is an object of the invention to provide an improved retreader into which a vehicle tire can be quickly and accurately fitted for vulcanization, preferably of the entire circumferential extent, of the road engaging tread portion of the tire. More specifically, it is sought to provide an improved tire vulcanizer adapted to receive a tire to be vulcanized without a preliminary deformation or rim mounting of the tire.

Another object is to provide a full circle retreading mold having movable segmental heaters for contacting the road engaging tread portions of a tire mounted in the retreader. As a preferential arrangement, the invention provides a full circle retreader having segmental heaters in which all of the heater segments are mounted for relative movement with respect to a common supporting structure.

A further object is to provide, in a retreader for vulcanizing a pneumatic vehicle tire, the combination of a heater or matrix segment body for contacting the road engaging tread portion of the tire being vulcanized and a pair of reversible shoulder segments mounted on the heater in spaced parallel relation for contacting the shoulder portions of such tire, the shoulder segments preferably having attaching flanges or ears disposed along the sides of the heater segments.

Still further objects of the invention pertain to improved means for mounting and actuating tire engaging heater segments of a vulcanizer. Included in such improvements is a toggle link arrangement for attaching a heater body to the supporting structure of the vulcanizer; a combination of link toggle joints and stabilizing links to mount a heater segment on the supporting structure; a combination of parallel motion toggle joints mounting the heater on the supporting structure; resilient means, preferably associated with the toggle joints, for biasing the heater for movement as, for example, toward the supporting structure as in withdrawing the heater from a vulcanized tire; a combination of toggle joints, preferably resiliently biased, for mounting the vulcanizing heater on the supporting structure, and fluid operated means for moving the heater into vulcanizing or operating position in which the heater is pressed against the tread portion of the tire being retreaded; and a combination, in a full circle wheel mold, of heater segments and a fluid operated device, preferably of the inflatable annulus type, interposed between the heater segments and the supporting structure, the annulus being arranged, upon inflation, to move all of the heater segments simultaneously into vulcanizing positions in which they are clamped adjacent to one another about the periphery of a tire being retreaded.

Still other and further objects of the invention pertaining to details of construction and combinations and arrangements of parts will become apparent in the following description of the invention made in connection with the accompanying drawings forming a part of the specification. Like parts throughout the several views are indicated by the same letters and numerals of reference. In the drawings:

Fig. 2 is an elevational view of one side of the apparatus of Fig. 1 showing the supporting ring, toggle joint supports, and the location of the box containing the control valves and devices;

Fig. 3 is a vertical sectional detail, with parts broken away and removed, taken substantially on the line indicated at 3—3 of Fig. 1 and enlarged with respect to that figure;

Figure 1:
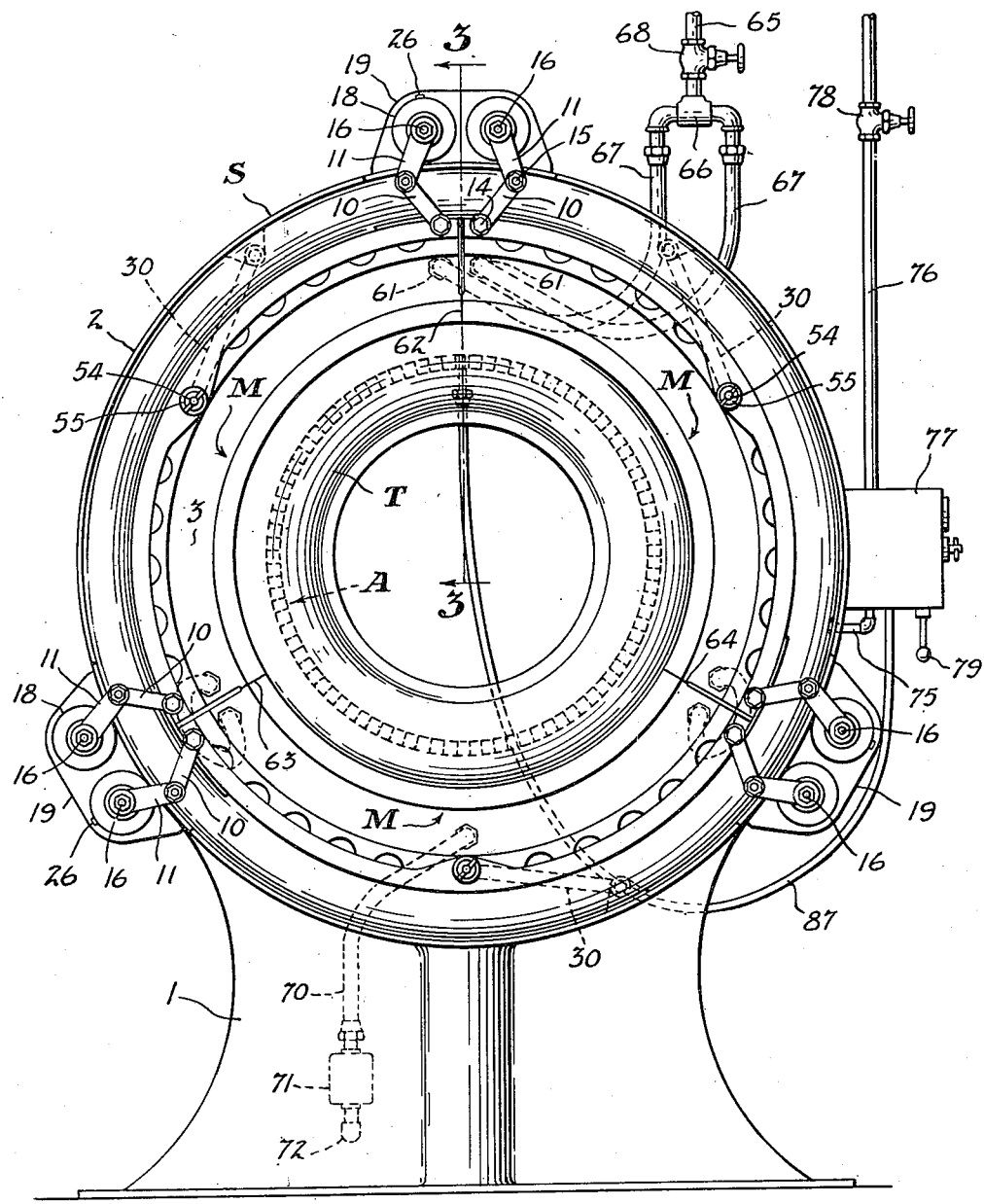
Figure 1 is a front elevational view of a full circle vulcanizing apparatus for retreading pneumatic vehicle tires, showing a tire mounted therein, the heater segments of the retreader being closed about the road engaging tread portion of the tire.

The tire retreader or vulcanizer of the present invention comprises a plurality of matrix segments M mounted on a supporting structure S for radial movement toward and away from closed or tire clamping positions. When closed, the matrix segments cooperatively provide an annular or full circle heating surface for contacting the road engaging tread portion of a tire T mounted in the apparatus and supported by the matrices. An inflation annulus A inside the tire T forces the tread and shoulder portions of the tire against the heated faces of the matrix segments M during the vulcanizing process.

The supporting structure S comprises a pedestal or base 1 surmounted by a circular ring 2 which constitutes the body of the structure. The ring may be conveniently formed of a steel plate bent to cylindrical form and secured to the base 1 as by welding, the base also being of steel or iron. The abutted ends of the ring 2 are securely joined to withstand the large expanding forces developed in compressing the matrix segments M about a tire during the vulcanizing process.

Each matrix segment is a composite unit including a hollow heater body 3 preferably formed of aluminum or other material having high heat conductivity. The heater boxes are received against the inwardly directed faces 4 of support segments 5. To center or locate the heaters on the support segments, the latter are formed along their side edges with shallow inwardly directed flanges 6 which engage radial flanges 7 of the heaters. Between the heaters 3 and the support segments 5, insulating air spaces 8 prevent excessive heating of the support segments. The heater flanges 7 which bear against the concave faces of the segments 5 are cut away or relieved at spaced intervals along their length, providing openings 9 for the passage of cooling air circulating through the insulating spaces 8.

Adjacent their ends the support segments 5 are individually connected to the supporting structure ring 2 by toggle joints comprising inner links 10 and outer links 11. Inner ends of the inner links are pivotally received on shouldered cap screws 14 threaded into the side faces or edges of the supporting segments 5. Joint ends of the toggle links 10 and 11 are pivotally connected together as by studs or bolts 15, and outer ends of the outer links are pivotally attached to the supporting structure. Preferably the outer ends of the toggle joints are received on shafts 16 mounted on the outside of the ring 2, as later described.

As a preferred arrangement, the toggle joints are arranged in companion pairs, there being two pairs of joints mounting each matrix segment on the supporting structure. One pair of joints is located at each end of each matrix segment, the joints of each pair being located one on each side of a matrix segment. Thus the pivots 14 attaching the inner ends of a companion pair of toggle joints to a matrix segment are arranged in axial alignment. The pivots 15, connecting the individual links 10 and 11 of the toggle joint pairs and located on opposite sides of the matrix segments, are likewise disposed in axial alignment.

In the present vulcanizer the toggle joints are resiliently biased to move the matrix segments M toward the supporting structure for the purpose of retracting or withdrawing the heaters 3 from a tire after the vulcanizing process is completed. To this end the outer toggle links 11 are keyed or pinned on the shafts 16, or, as shown, are formed with square socket ends received on square section ends of the shafts. Thus the toggle joints of each companion pair operate synchronously and in unison, providing for parallel movement of the matrix segments and preventing lateral tilting of the matrix segments in movements toward and away from a tire being processed.

Adjacent their ends the shafts 16 are formed with reduced diameter portions rotatably received in journals 17. These journals are circular end pieces or plugs fitted with suitable bushings for the shafts 16 and recessed into the ends of cylindrical steel tubes or barrels 18. The tubes 18 may be welded directly to the supporting structure but are preferably mounted in aligned circular openings formed in spaced parallel plate brackets 19. The edges of the brackets are welded or otherwise secured against the outside face of the ring structure 2.

The shafts 16 extend axially through the tubes 18, thus defining annular chambers 20 in which are disposed helical coil springs 21 surrounding the shafts. The springs 21 are each formed with an axial end extension 22 received in radial slot 23 formed in a circular disc 24 secured on the shaft 16 surrounded by the spring. The other ends of the springs are each formed with a radial extension 26 which extends out through one of a number of slots 27 opening through the ends of the housing tubes 18. The resilient springs 21 yieldingly resist turning of the shafts 16. Stress in each of the springs, provided in initial assembly, tends to actuate the toggle joints to retract the matrix segments and to move such segments radially outward toward the supporting ring 2. Assembly under initial stress may be effected by applying a wrench or crank to one of the square ends of the shaft 16 to turn the shaft in the desired direction, the toggle joint link 11 on such end being removed. The amount of stress thus imparted to each of the springs may be individually varied within close limits by changing the position of the spring end 26 in the slots 27, by turning the shaft different amounts in the pre-loading operation, or by both methods.

Intermediate the toggle joints each of the matrix segments M is connected to the supporting structure by one or more non-radial stabilizing links 30 which, in combination with the toggle joints, restrict the movements of the matrix segments relative to the supporting structure to predetermined paths. Each stabilizing link is received for pivotal movement on a shouldered stud 31 secured to a bracket 32 welded to the inside face of the ring 2 adjacent one or the rear edge of the latter. The other or inner end of each stabilizing link is received for pivotal movement on the reduced diameter end of a stud 33 received in a socket formed in a radially enlarged portion 34 of the support segment flange 6. The studs are held in place by suitable means such as set screws 35.

Interposed between the matrix segments M and the inner cylindrical face of the confining ring 2 of the supporting structure is a fluid operated device for actuating the matrix segments and clamping them about the periphery of a tire. It is conceived that the fluid operated device preferably takes the form of an inflatable annulus 40 formed of rubber or rubberized fabric. This annulus is made to withstand high fluid pressures of the order of about one hundred to about two hundred or more pounds per square inch. Reinforcement of the rubber is therefore employed, cords 43 preferably being arranged radially or crosswise of the annulus rather than circumferentially thereof so as to give maximum reinforcement against lateral failure of the unsupported sides of the annulus while giving minimum restriction to circumferential compression of the inner layer of the tube which occurs during inflation. The annulus is made up of cord ply material strips such as or similar to the rubberized ply material used in the manufacture of vehicle tires. The individual cords are diagonally disposed, preferably at an angle of about 15° to the edges of the strips. Several layers of the ply material are built up, as many as six or more plies being used satisfactorily. After thus assembling the plies with overlapped edges and with suitable covering rubber, the annulus is cured in flattened or collapsed shape either in open steam or in a mold.

Figure 4:
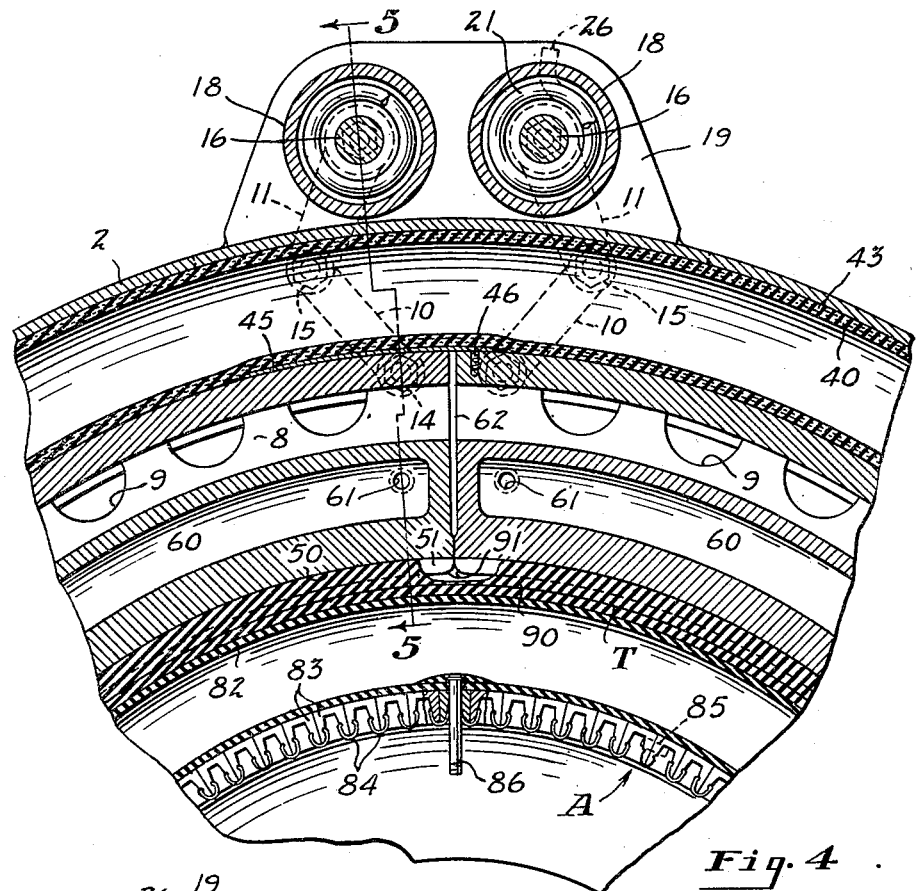
Fig. 4 is a vertical sectional detail, with parts broken away and removed, taken substantially along the line indicated at 4—4 of Fig. 3.
Figure 5:
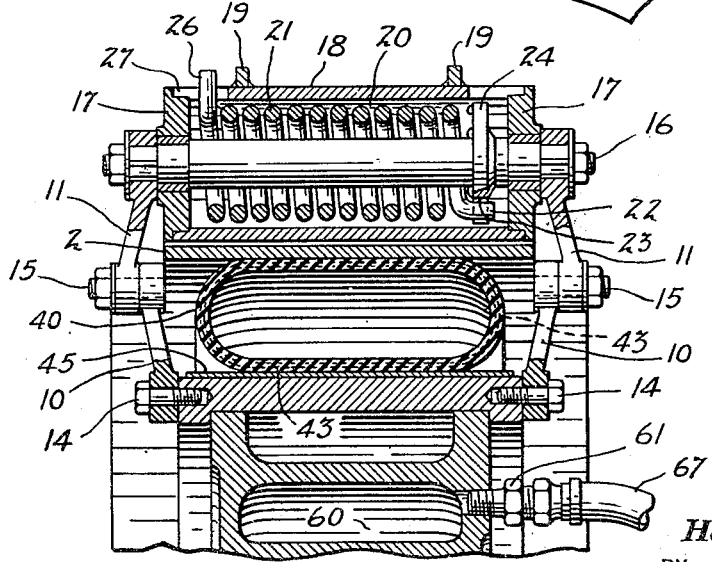
Fig. 5 is a fragmentary sectional detail, with parts broken away and removed, taken substantially along the line indicated at 5—5 of Fig. 4.

The rubber annulus 40 is straddled by the links of each companion pair of toggle joints, the latter serving to hold the matrix segments against axial displacement relative to the outer ring 2. Upon inflation, the annulus acts to contract the segments about a tire simultaneously, by direct bearing engagement of the annulus against the outwardly directed convex faces of the support segments 5. When the apparatus is in open tire receiving or tire removing position, with the matrix segments retracted, ends 41 of the segments are separated from one another by spaces 42. Gap closing plates 45 are disposed to bridge across the spaces 42 between the ends of adjacent matrix segments to prevent pinching of portions of the inflation device 40 between the segments during closing of the vulcanizer about a tire. The plates 45 are formed of spring sheet steel, each plate having one end secured to a support segment end by means of screws 46 (Fig. 4) and having the other end of the plate slidable over the outer cylindrical surface of the adjacent support segment.

By reason of the circulation of ambient air through the vent openings 9 and the spaces 8 between the heaters 3 and the supporting segments 5, the support segments remain at a considerably lower temperature than the heaters 3 and objectionable heating of the rubber annulus 40 is thus avoided. The heaters 3, each of arcuate form, have inwardly directed concave faces 50 which contact the road engaging tread surface of a tire being vulcanized and heat the rubber being cured. Configurations such as ribs 51 may be cast integrally on the heaters to form a tread pattern on the faces 50 of the heaters. Radial inwardly extending ribs 52 may be formed circumferentially along the sides of the heaters in parallel relation to one another for engaging the shoulder portions of the tire T and restraining lateral flow of fresh rubber 90 being added to the tire in the retreading or recapping operation.

Although the heaters 3 may be permanently attached to the support segments 5, as by screws or welding, it is preferable to provide for facile removal and interchange of such heaters with other heaters having different tread forming configurations or wider tread contacting surfaces 50 for the purpose of accommodating tires of different sizes. As a means for rapid removal and replacement of the heaters, detent pins 54 are slidably mounted in tubular barrels 55 received in recesses formed in radial enlargements 56 of support segment flanges 6. The barrels 55 are held in the flange recesses as by set screws 57. Within the barrels 55 helical coil springs 58 are compressed between the ends of the barrels and enlargements or shoulders on the detent pins 54 to urge the detents into recesses 59 in the heater flanges 7. Withdrawal of the detents 54 from the socket recesses 59 releases the heaters 3 for removal of the heaters from the support segments. After replacement of the heaters the action of the springs 58 holds the detents in the sockets to lock the heaters in place against the inner faces of the support segments. Desirably the detents 54 are located in axial alignment with the pivot pins 33 for the stabilizing links 30, such axis being parallel to the center axis of the cylindrical support ring 2.

The heaters 3 may be heated by conventional means, high pressure steam being preferred. Each heater body is formed with an internal steam chamber 60 closed at the ends of the heater. Threaded fittings 61 are screwed into threaded openings in the sides of the heaters and communicate with the steam chambers 60 adjacent the ends of such chambers.

The three matrix segments, each approximately 120° in circumferential extent, are arranged so that one parting line occurs at the top center of the apparatus, being indicated at 62. The other parting lines, indicated at 63 and 64, occur at the lower side portions of the apparatus equidistant from one another and from the parting line 62. High pressure steam from a suitable source is conducted to the apparatus through a pipe or supply conduit 65 which branches at a T 66. Flexible conduits 67 connect the T 66 to the fittings 61 in the upper ends of the top heaters. A valve 68 controls the flow of steam from the supply pipe 65 to the apparatus. The lower ends of the heating chambers 60 of the two upper matrix segments are connected by short flexible steam conduits 69 to the fittings 61 communicating with the ends of the heating chamber 60 of the bottom matrix segment. Thus a parallel flow of steam or heating fluid is provided downwardly through the two upper heaters of the matrix segments and into the opposite ends of the heating chamber of the bottom segment. Condensate is withdrawn from the center of the heating chamber of the bottom segment through a flexible conduit 70 connected to a suitable return line 72 or vacuum pump through a conventional steam trap 71.

Figure 7:
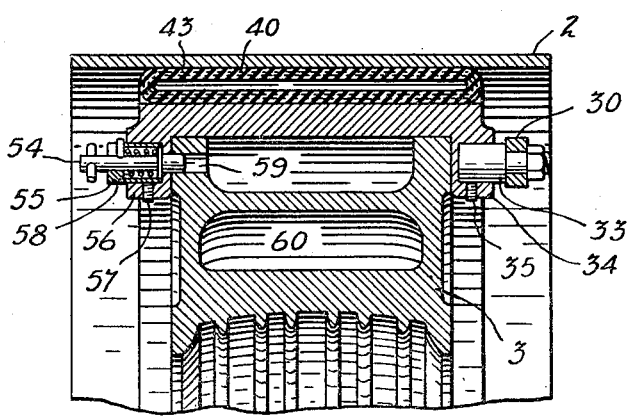
Fig. 7 is a sectional detail, with parts broken away and removed, taken substantially along the line indicated at 7—7 of Fig. 6.

Air or other pneumatic fluid for inflating the hollow matrix compressing annulus 40 is introduced into the latter through a suitable stem or conduit 75 which is connected to a supply line 76 through a conventional three-way control valve contained in a box 77 mounted on one side of the supporting structure S. The air supply line 76 has a main shutoff valve 78 and the valve which controls the supply of air to the annulus 40 is manually operated by a handle 79 which depends below the box 77. A pressure indicating gauge 80 is interposed in the air line or conduit between the valve operated by the handle 79 and the conduit 75 supplying the annulus to show the fluid pressure within the annulus 40. In one position of the operating handle 79 the control valve connects the conduit 75 to the supply conduit 76 so that the annulus 40 can be inflated. In another position of the handle 79 the valve vents the conduit 75 to atmosphere so that air or fluid in the annulus 40 is discharged by the inherent resiliency of the annulus which tends to return to its normal or molded shape, shown in Fig. 7. The springs 21 tend to retract the matrix segments toward the supporting ring 2, thereby squeezing the annulus 40 to the flattened shape of Fig. 7 in which the annulus is compressed between the matrix segments and the cylindrical inner surface of the supporting ring 2.

The inflation device or annulus A disposed within the tire T to press the tread and shoulders of the latter outwardly against the matrix segments may be of conventional construction. Preferably, however, the improved construction illustrated is used, the details being more fully described in copending application for patent, Serial No. 48,887, filed September 11, 1948. Briefly described, the inflation annulus comprises an inflatable annular rubber tube 82, preferably fabric reinforced, and a supporting ring made up of a number of keystone elements 83 connected by channel shaped C section springs 84. An adjoining pair of the elements 83 are connected by interfitting pins 85, the springs 84 being omitted between such pair of elements. This pair of joint elements can be drawn apart circumferentially and separated from one another for coiling or collapsing of the support ring when inserting the ring into or removing the ring from a tire.

Air or other pneumatic fluid is introduced into the tube 82 of the inflation device through a conventional valve stem 86 connected to the supply line 76 by a flexible conduit 87 and a three-way control valve mounted in the box 77. This control valve is similar to the valve which controls the admission of air into the annulus 40 and has a depending handlle 88 which, when moved to one or open position, operates the valve to admit high pressure air into the tube 82 through the conduit 87. When moved to another position, the handle operates the valve to vent the tube to atmosphere. A pressure indicating gauge 89 is interposed in the connection between the valve having the handle 88 and the flexible conduit 87 to show the pressure in the inflation annulus.

Figure 6:
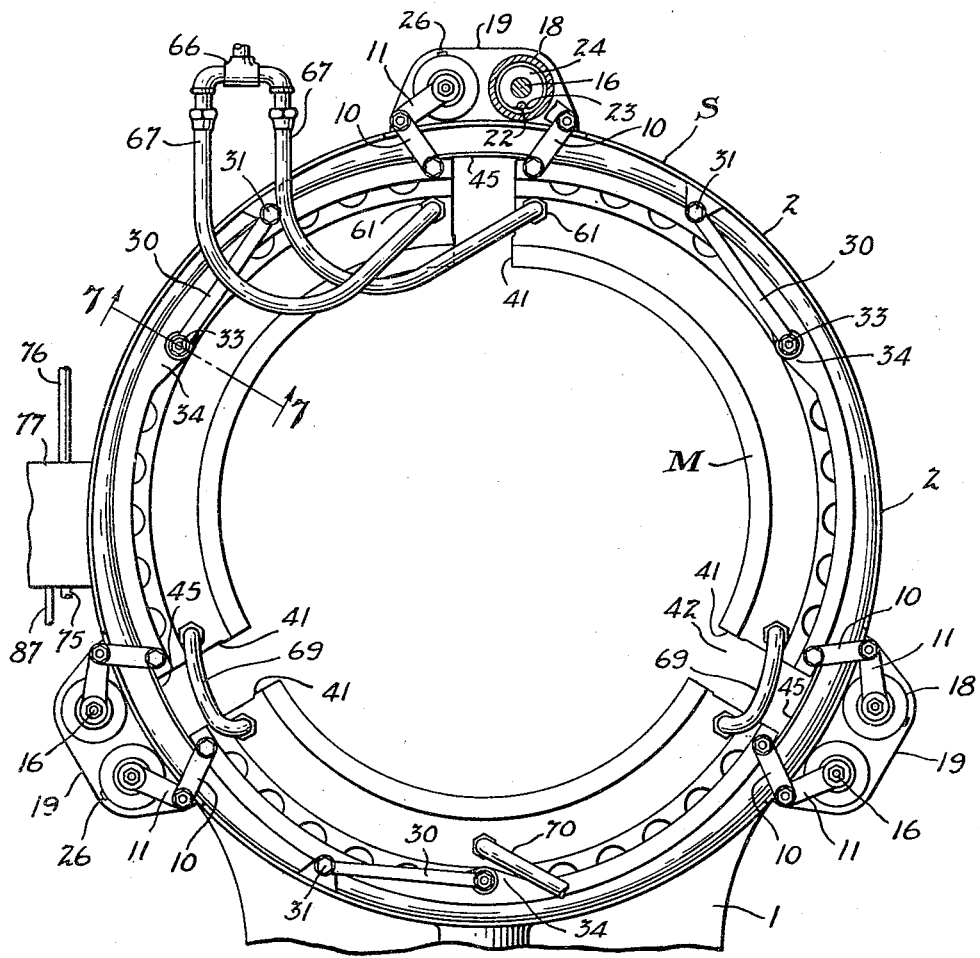
Fig. 6 is a rear elevational view of the retreader, with parts broken away and removed, this view showing the heater segments retracted and the tire removed.

In using the apparatus described above for retreading or recapping a tire, the operator vents the annulus 40 to atmosphere, permitting the annulus to collapse or be collapsed by the retraction of the matrix segments as biased by the springs 21. With the matrix segments thus retracted substantially to the positions shown in Fig. 6, a tire, previously prepared for retreading or vulcanization by the application thereto of a strip of fresh or uncured rubber 90 to or about the road engaging tread portion or periphery, is placed within the matrix segments and rests on the ribs 51 and concave face 50 of the bottom heater. The shoulder confining or engaging flanges 52 of the bottom heater serve as locators to position the tire in the apparatus.

The inflation device A may be assembled in the tire before or after the latter is positioned in the apparatus. Air is initially introduced into the tube 82 of the inflation device at relatively low pressure to hold the parts of the inflation device in desired positions within the tire but not at sufficient pressure to expand the tire appreciably from its normal shape. Thereafter the valve handle 79 is moved by the operator so that the valve controlled thereby introduces high pressure air or pneumatic fluid into the matrix compressing annulus 40, closing the matrix segments about the tire. During this closing operation the ribs 51 of the heaters 3 slide circumferentially about the new rubber 90 on the tire T. To prevent cutting and gouging or other injury to the new rubber the end corners of the ribs are rounded as indicated at 91.

In handling large tires, the apparatus may be used as a bead spreader to facilitate insertion of the inflation device A. Clamping the matrix segments about such a tire compresses the tire radially, causing the beads to move apart. The inflation device is then readily placed and adjusted.

After the mold is closed and the matrix segments are clamped tightly about the tire by the compressing action of the fluid operated device or annulus 40, additional air under high pressure is introduced into the tube 82 of the inflation device A to expand the tire T and to press the new rubber 90 firmly against the face and ribs of the matrix heaters 3. The limited area of contact between the tube 82 of the inflation device and the inside of the tire T minimizes the stress imposed on the tire carcass so that the vulcanization is accomplished without objectionable damage to the reinforcing cords of the tire. As shown in Fig. 3, the internal inflation tube 82, which provides internal support for the tread and shoulder portions of the tire, contacts the interior of the tire across the crown only so that the side walls of the tire are substantially unstressed and are not heated directly by any of the components of the apparatus. The relatively narrow edges of the flanges 52 of the heater segments 3 press firmly against the relatively thick shoulders of the tire, indicated at 92, and confine the new rubber 90 to the desired road engaging tread portion of the tire during the vulcanizing operation.

Upon completion of the vulcanizing process the inflation air is released from the matrix contracting annulus 40 and from the inflation annulus 82 by actuation of the valve handles 79 and 83 to move the respective valves to venting positions. With the air thus released from the compressing annulus 40, the matrix segments M are retracted by the springs 21 and toggle links 10 and 11. In some instances it may be desirable to reintroduce air into the inflation annulus 82 for the purpose of distorting the vulcanized tire to free it from one or more of the heaters 3.

Figure 8:
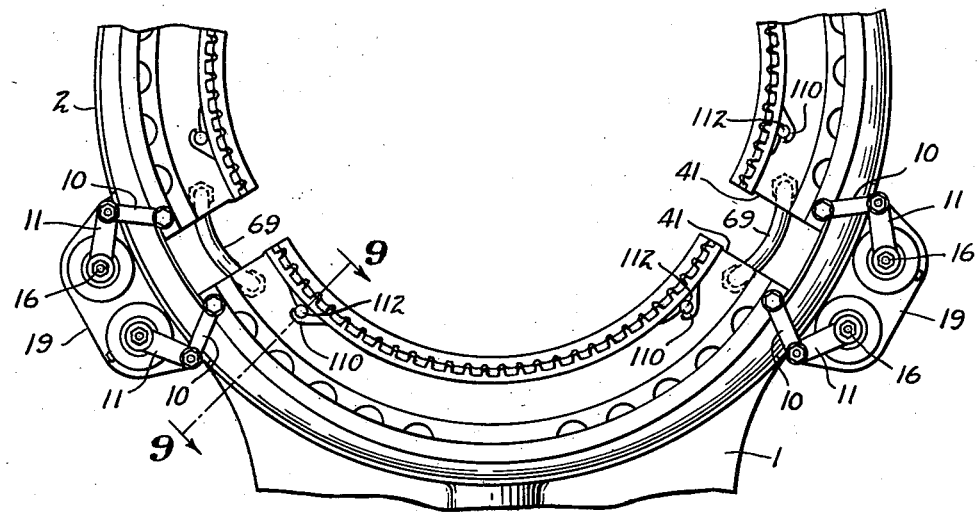
Fig. 8 is a fragmentary elevational view showing the use of reversible shoulder heating segments, parts of the structure being broken away and removed.
Figure 9:
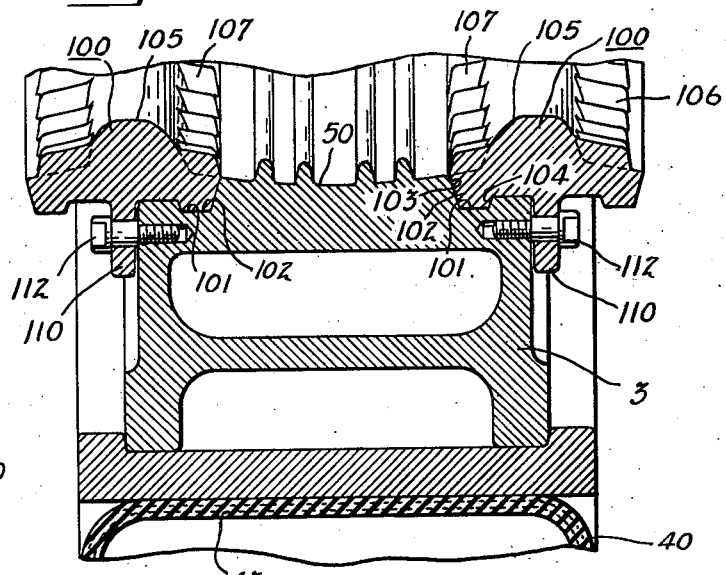
Fig. 9 is a sectional detail, with parts broken away and removed, taken substantially along the line indicated at 9—9 of Fig. 8.
Figure 10:
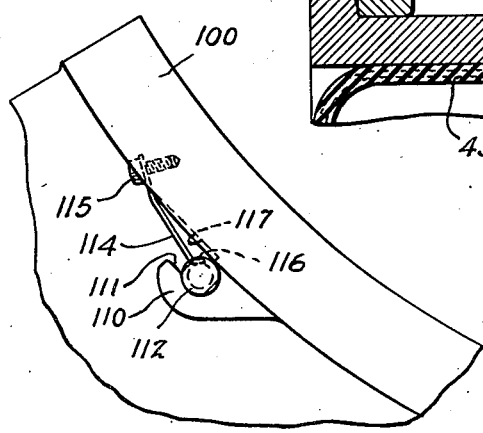
Fig. 10 is an elevational detail showing one of the retaining flanges and supporting studs used to mount the reversible shoulder segments.

To provide for vulcanization of tires having different tread widths, a modified structure such as that illustrated in Figs. 8 through 10 is employed. In this embodiment of the invention the parts corresponding to those identified in the previous description are indicated by the same letters and numerals of reference. In lieu of the integral shoulder contacting flanges 52, previously described, the modified apparatus employs removable shoulder segments 100. These segments are of arcuate form and are of the same circumferential length as the faces 50 of the heaters 3. Along the side margins of the heater faces, channels or grooves 101, tapered radially, receive matching circumferentially extending flanges 102 formed on the shoulder segments 100. Inner walls 103 and outer walls 104 of the channels 101 are flat and converge toward one another. The inner wall of each channel is of greater radial height than the outer wall.

The flanges 102 are formed along both sides of the shoulder segments in spaced parallel relation to one another so that such shoulder segments may be reversed with respect to the heaters 3. Along the inner face of each of the shoulder segments is formed a raised portion or shoulder contacting flange 105 which is laterally offset. The flanges 105 of the shoulder segments thus divide the faces of such segments into wide and narrow tread contacting surfaces 106 and 107 respectively. When the shoulder segments are disposed with the narrow face portions 107 adjacent the faces 50 of the heaters 3, the apparatus is arranged for vulcanizing a tire having relatively narrow treads. Reversal of the shoulder segments to position the relatively wide faces 106 of the shoulder segments adjacent the faces 50 of the heaters arranges the apparatus for vulcanizing tires having relatively wide treads.

To secure the shoulder segments in place for facile removal, interchange, and reversal, the segments are formed with integral radial ears or flanges 110 which extend along the side faces of the heaters 3. These retaining flanges or ears are formed with circumferential notches or slots 111 that are received on shouldered cap screws 112 threaded into the side faces of the heaters. Leaf springs 114 are secured to the shoulder segments 100 by cap screws 115 and have curved ends 116 that bear against the shanks of the cap screws 112 to retain the cap screws in the slots 111. When it is desired to remove or reverse the shoulder segments, the springs 114 are manually depressed into recesses 117 provided therefor in the shoulder segments, permitting the screws 112 to clear the springs so that the shoulder segments can be slid circumferentially off the cap screws.

In accordance with the patent statutes, the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. In vulcanizing apparatus for use in retreading tires, a supporting structure, a matrix, means for heating the matrix, means mounting the matrix for movement toward and away from the supporting structure, said mounting means comprising companion pairs of links forming toggle joints, means connecting one link of each pair to the matrix for pivotal movement about a common axis, shaft means journaled on the supporting structure, the other link of each pair being secured to said shaft means for pivotal movement of said other links in unison, and coil spring means surrounding and connected to the shaft means and to the supporting structure to bias the shaft means to actuate the toggle joint links for movement of the matrix toward the supporting structure.

2. In vulcanizing apparatus for use in retreading tires, a supporting structure, a matrix, means for heating the matrix, means mounting the matrix for movement toward and away from the supporting structure, said mounting means comprising a pair of links forming a toggle joint, a housing secured to the supporting structure, a journal carried by the housing, shaft means extending into the housing through the journal, the links of said pair being connected one to the matrix and the other to the shaft means, and spring means in the housing acting on the shaft means to bias the toggle joint for movement of the matrix toward the supporting structure.

3. In vulcanizing apparatus for use in retreading tires, a supporting structure, a matrix, means for heating the matrix, means mounting the matrix for movement on the supporting structure, said mounting means including a pair of links forming a toggle joint and connected one to the matrix and the other to the supporting structure, a stabilizing link pivotally connected at one end to the matrix and at the other end to a fixed pivot on the supporting structure, fluid operated means interposed between the supporting structure and the matrix for moving the matrix in one direction relative to the supporting structure in pressing the matrix against a tire during vulcanization of the latter, and resilient means acting to bias the matrix for movement in another direction relative to the supporting structure for withdrawing the matrix from a vulcanized tire.

4. In vulcanizing apparatus for use in retreading tires, a supporting structure, a matrix, means for heating the matrix, means mounting the matrix for movement toward and away from the supporting structure, said mounting means comprising shafts journaled on the supporting structure in spaced parallel relation, pairs of links forming toggle joints, one link of each pair being pivotally connected to the matrix and the other link of each pair being secured to one of the shafts, resilient means acting on the shafts to bias the toggle joints to draw the matrix toward the supporting structure, and fluid operated means interposed between the supporting structure and the matrix to force the matrix away from the supporting structure and hold the matrix against a tire being vulcanized.

5. In vulcanizing apparatus for use in retreading tires, a supporting structure, a matrix, means for heating the matrix, means mounting the matrix for movement toward and away from the supporting structure, said mounting means comprising shafts journaled on the supporting structure in spaced parallel relation, a companion pair of toggle joints on each shaft in spaced parallel relation, one link of each toggle joint being connected to the matrix and the other link of each toggle joint being secured to one of the shafts to turn therewith, an inflatable member interposed between the supporting structure and the matrix, and means for inflating said member to force the matrix away from the supporting structure and hold the matrix against a tire being vulcanized, the inflatable member being located between the companion toggle joint pairs.

6. Vulcanizing apparatus for use in retreading tires comprising a supporting ring, a plurality of matrix segments, each matrix segment including a heater body for contacting the road engaging tread portion of a tire being vulcanized and a pair of curved reversible ring segments secured to the heater body in direct heat conducting relation thereo and in parallel relation to one another for facile removal and reversal, means mounting the segments within the ring for relative movement to and from a tire clamping position in which the segments cooperatively define a substantially circular heater, means for supplying heat to the heater bodies of the matrix segments while the latter are in tire clamping position to heat the ring segments by conduction, an inflatable member interposed between the ring and the matrix segments, and means for inflating said member to force the segments away from the ring to tire clamping position.

7. Vulcanizing apparatus for use in retreading tires comprising a supporting ring, a plurality of matrix segments, each matrix segment including a heater body for contacting the road engaging tread portion of a tire being vulcanized and a pair of arcuately curved members disposed in spaced parallel relation along the sides of the heater body for contacting the shoulder portions of such a tire, said curved members having radially extending flanges overlying the heater body sides, stud means extending through the curved member flanges and secured to the heater body to secure the curved members in place, means mounting the segments within the ring for relative movement to and from a tire clamping position in which the segments cooperatively define a substantially circular heater, means for supplying heat to the heater bodies of the matrix segments while the latter are in tire clamping position to heat the curved members by conduction, an inflatable member interposed between the ring and the matrix segments, and means for inflating said member to force the segments away from the ring to tire clamping position.

8. In vulcanizing apparatus of the full circle type for retreading tires, said apparatus including a supporting structure and at least one segmental matrix member movable toward and away from the center of the circle, spaced pairs of toggle links extending between the supporting structure and the matrix member for mounting the latter, one link of each pair being pivoted on the supporting structure, the other link of each pair being pivoted on the matrix member, and a stabilizing link pivotally connected to the supporting structure and to the matrix member for limiting the movement of the latter.

9. In vulcanizing apparatus of the full circle type for retreading tires, said apparatus including a supporting structure and at least one segmental matrix member movable toward and away from the center of the circle, spaced pairs of toggle links extending between the supporting structure and the matrix member for mounting the latter, one end of one link of each pair being pivoted on the supporting structure, one end of the other link of each pair being pivoted on the matrix member, the other ends of the links of each pair being pivoted together in the provision of knuckle joints, resilient means associated with at least one of the toggle link pairs biasing the matrix member for movement away from the center of the circle, and a stabilizing link pivotally connected to the supporting structure and to the matrix member for limiting the movement of the latter.

10. In vulcanizing apparatus of the full circle type for retreading tires, said apparatus including a supporting structure and at least one segmental matrix member movable toward and away from the center of the circle, spaced pairs of toggle links extending between the supporting structure and the matrix member for mounting the latter, one link of each pair being pivoted on the supporting structure, the other link of each pair being pivoted on the matrix member, and means located between the toggle link pairs and connected to both the supporting structure and the matrix member for limiting movement of the latter.

11. In vulcanizing apparatus of the full circle type for retreading tires, said apparatus including a supporting structure and at least one segmental matrix member movable toward and away from the center of the circle, spaced pairs of toggle links extending between the supporting structure and the matrix member for mounting the latter, one link of each pair being pivoted on the supporting structure, the other link of each pair being pivoted on the matrix member, and a stabilizing link pivotally connected to the supporting structure and to the matrix member intermediate the respective pivots of the toggle links on the supporting structure and the matrix member.

12. In vulcanizing apparatus of the full circle type for retreading tires, said apparatus including a supporting structure and at least one segmental matrix member movable toward and away from the center of the circle, spaced pairs of toggle links extending between the supporting structure and the matrix member for mounting the latter, one link of each pair being pivoted on the supporting structure, the other link of each pair being pivoted on the matrix member, an inflatable bag interposed between the matrix member and the supporting structure, the bag being adapted upon inflation resiliently to force the matrix member toward the center of the circle, and spring means carried by the supporting structure and acting on the matrix member in opposition to the inflatable bag, said spring means being energized upon movement of the matrix member toward the center of the circle to provide a restoring force for moving the matrix member away from such center upon release of the bag force.

13. In vulcanizing apparatus for use in retreading tires, a supporting structure, a matrix, means for heating the matrix, and means mounting the matrix for movement toward and away from the supporting structure, said mounting means comprising companion pairs of links forming toggle joints, means connecting one link of each pair to the matrix for pivotal movement about a common axis, shaft means journaled on the supporting structure, the other link of each pair being secured to said shaft means for pivotal movement of said other links in unison, and resilient means acting on the shaft means to bias the shaft means to actuate the toggle joint links for movement of the matrix toward the supporting structure.

14. In vulcanizing apparatus of the full circle type for retreading tires, said apparatus including a supporting structure and at least one segmental matrix member movable toward and away from the center of the circle, companion links extending between the supporting structure and the matrix member for mounting the latter, said links having corresponding ends supported on the structure for turning of the links about a common axis in spaced, generally parallel planes, and means connecting the links and constraining the latter to turn in unison about said common axis.

15. In vulcanizing apparatus of the full circle type for retreading tires, said apparatus including a supporting structure and at least one segmental matrix member movable toward and away from the center of the circle, companion pairs of toggle links extending between the supporting structure and the matrix member for mounting the latter, corresponding links of the pairs having corresponding ends supported on the structure for turning movement of such corresponding links about a common axis in spaced generally parallel planes and means connecting corresponding links of the companion pairs and constraining such connected links to turn in unison about said common axis.

16. In vulcanizing apparatus for use in retreading tires, a supporting structure, a matrix, means for heating the matrix, and means mounting the matrix for movement toward and away from the supporting structure, said mounting means comprising companion pairs of links forming toggle joints, a housing secured to the supporting structure, a bearing carried by the housing, shaft means extending into the housing through the journal, one link of each pair being connected to the matrix and the other link of each pair being secured to the shaft means, and coil spring means in the housing, said spring means being connected to the housing and to the shaft means to bias the shaft means to actuate the toggle joint links for movement of the matrix toward the supporting structure.

17. In vulcanizing apparatus for use in retreading tires, a supporting structure, a matrix, means for heating the matrix, and means mounting the matrix for movement toward and away from the supporting structure, said mounting means comprising shafts journaled on the supporting structure in spaced parallel relation, pairs of links forming toggle joints, one link of each pair being pivotally connected to the matrix and the other link of each pair being secured to one of the shafts, and resilient metal spring means acting on the shafts to bias the toggle joints to draw the matrix toward the supporting structure.

18. In a full circle vulcanizing apparatus for use in retreading tires, a supporting ring, a plurality of matrix segments disposed within the ring for cooperatively surrounding the road engaging periphery of a tire being retreaded, an inflatable member interposed between the ring and the segments for contracting the latter, pairs of toggle links connecting the segments to the ring, the toggle link pairs being arranged in companion units with one link pair of each unit disposed on one side of the inflatable member and another link pair of each unit disposed on the other side of the inflatable member, and means connecting corresponding links of each companion unit constraining the toggle links of each companion unit to movement in unison.

19. In a full circle vulcanizing apparatus for use in retreading tires, a supporting ring, a plurality of matrix segments disposed within the ring for cooperatively surrounding the road engaging periphery of a tire being retreaded, an inflatable member interposed between the ring and the segments for contracting the latter, pairs of toggle links connecting the segments to the ring, the toggle link pairs being arranged in companion units with one link pair of each unit disposed on one side of the inflatable member and another link pair of each unit disposed on the other side of the inflatable member, corresponding links of each of the companion units being attached to one of the segments for turning about a common axis substantially normal to the plane of the supporting ring, and means connecting corresponding links of each companion unit constraining the toggle links of each companion unit to movement in unison.

20. In a full circle vulcanizing apparatus for use in retreading tires, a supporting ring, a plurality of matrix segments disposed within the ring for cooperatively surrounding the road engaging periphery of a tire being retreaded, an inflatable member interposed between the ring and the segments for contracting the latter, pairs of toggle links connecting the segments to the ring, the toggle link pairs being arranged in companion units with one link pair of each unit disposed on one side of the inflatable member and another link pair of each unit disposed on the other side of the inflatable member, corresponding links of each of the companion units being attached to the ring for turning about a common axis, other corresponding links of each of the companion units being attached to one of the segments for turning about a common axis, and the several turning axes being substantially parallel to one another and substantially normal to the plane of the ring.

21. In a full circle vulcanizing apparatus for use in retreading tires, a supporting ring, a plurality of matrix segments disposed within the ring for cooperatively surrounding the road engaging periphery of a tire being retreaded, an inflatable member interposed between the ring and the segments for contracting the latter, pairs of toggle links connecting the segments to the ring, the toggle link pairs being arranged in companion units with one link pair of each unit disposed on one side of the inflatable member and another link pair of each unit disposed on the other side of the inflatable member, corresponding links of each of the companion units being attached to the ring for turning about a common axis, other corresponding links of each of the companion units being attached to one of the segments for turning about a common axis, the several turning axes being substantially parallel to one another and substantially normal to the plane of the ring, and means connecting corresponding links of each companion unit constraining the toggle links of each companion unit to movement in unison.

22. In a full circle vulcanizing apparatus for use in retreading tires, a supporting structure, a plurality of matrix segments mounted on the structure, and means for moving the segments toward and away from the center of the apparatus in closing and opening the segments about the road engaging periphery of a tire being retreaded, the matrix segments having tire contacting faces directed toward the center of the apparatus and formed with circumferential ribs, the ends of the matrix segments being in abutment with one another when the segments are closed about a tire being vulcanized, the ribs on adjacent ends of the segments being aligned when the apparatus is so closed, and the rib ends being tapered into the planes of abutment between the matrix segments to minimize pinching of the tread stock of a tire being retreaded during closing of the apparatus.

23. In a full circle vulcanizing apparatus for use in retreading tires, a supporting structure, a plurality of matrix segments mounted on the structure, and means for moving the segments toward and away from the center of the apparatus in closing and opening the segments about the road engaging periphery of a tire being retreaded, the matrix segments comprising hollow arcuate heaters having curved faces for contacting the periphery of a tire enclosed in the apparatus, said tire contacting faces of the segments having ribs for forming grooves in the road engaging tread portion of an enclosed tire, said ribs extending substantially to the ends of the matrix segments, the rib ends being chamfered to avoid pinching the tread rubber stock of a tire as the ends of the matrix segments and the ribs move together during closing of the apparatus.

24. In full circle vulcanizing apparatus for use in retreading tires, a supporting ring, a circular heater comprising a plurality of matrix segments disposed within the ring and arranged cooperatively to define a circular molding surface for surrounding and shaping the road engaging periphery of a tire being retreaded in the apparatus, means for heating the matrix segments, and means mounting the segments on the ring for movement toward and away from a common center in contracting and expanding the heater, said mounting means comprising a plurality of pairs of levers spaced about the supporting ring, the levers of each pair being disposed one on each side of the ring and having corresponding ends secured to the ring to turn about a common axis transverse to the plane of the ring, means connecting the levers of each pair together to turn simultaneously and in unison, and means for moving the segments simultaneously to contract the heater about a tire.

25. In full circle vulcanizing apparatus for use in retreading tires, a supporting ring, a circular heater comprising a plurality of matrix segments disposed within the ring and arranged cooperatively to define a circular molding surface for surrounding and shaping the road engaging periphery of a tire being retreaded in the apparatus, means for heating the matrix segments, and means mounting the segments on the ring for movement toward and away from a common center in contracting and expanding the heater, said mounting means comprising a plurality of shafts journaled on the ring, a pair of levers secured rigidly to each of the shafts in spaced relation to turn in unison about a common axis, means connecting each matrix segment individually to a plurality of said levers, means for actuating the segments in a simultaneous contracting movement, and resilient means acting on the said shafts and exerting restoring forces on the said levers in opposition to the actuating means for expanding the heater.

26. In a full circle vulcanizing apparatus for use in retreading tires, a supporting ring, a circular heater comprising a plurality of matrix segments disposed within the ring and arranged cooperatively to define a circular molding surface for surrounding and shaping the road engaging periphery of a tire being retreaded in the apparatus, means for heating the matrix segments, and means mounting the segments on the ring for movement toward and away from a common center in contracting and expanding the heater, said mounting means comprising a plurality of shafts journaled on the ring in circumferentially spaced relation and for rotary movement about parallel axes, a pair of levers secured rigidly to each of the shafts in spaced relation to turn in unison about a common axis, means connecting circumferentially spaced portions of each segment to the levers on spaced shafts, means for actuating the segments in a simultaneous contracting movement, and resilient means acting on the shafts and exerting restoring forces on the levers in opposition to the actuating means for expanding the heater.

27. In full circle vulcanizing apparatus for use in retreading tires, a supporting ring, a circular heater comprising a plurality of matrix segments disposed within the ring and arranged cooperatively to define a circular molding surface for surrounding and shaping the road engaging periphery of a tire being retreaded in the apparatus, means for heating the matrix segments, and means mounting the segments on the ring for movement toward and away from a common center in contracting and expanding the heater, said mounting means comprising a plurality of shafts journaled on the ring, toggles connected between the shafts and the matrix segments, each toggle including a lever link rigidly secured on the shaft to which the toggle is connected and each shaft having thereon a plurality of such toggle lever links disposed in spaced generally parallel relation for turning movements in unison about a common axis, means for actuating the segments in a simultaneous contracting movement, and resilient means acting on the shafts and exerting restoring forces on the levers in opposition to the actuating means for expanding the heater.

28. In full circle vulcanizing apparatus for use in retreading tires, a supporting ring, a circular heater comprising a plurality of matrix segments disposed within the ring and arranged cooperatively to define a circular molding surface for surrounding and shaping the road engaging periphery of a tire being retreaded in the apparatus, means for heating the matrix segments, and means mounting the segments on the ring for movement toward and away from a common center in contracting and expanding the heater, said mounting means comprising a plurality of shafts journaled on the ring in circumferentially spaced relation and for rotary movement about parallel axes, companion pairs of toggles connected between the shafts and the matrix segments, each pair of toggles having corresponding lever links rigidly secured on a common shaft in spaced relation and constituting a lever pair mounted for turning about a common axis, circumferentially spaced portions of each segment being connected to the toggles on circumferentially spaced shafts, means for actuating the segments in a simultaneous contracting movement, and resilient means acting on the shafts and exerting restoring forces on the levers in opposition to the actuating means for expanding the heater.

29. In vulcanizing apparatus for use in retreading tires, a supporting structure, a matrix, means for heating the matrix, and means mounting the matrix for movement toward and away from the supporting structure, said mounting means comprising a shaft journaled on the supporting structure, levers connected between the supporting structure and the matrix, said levers being rigidly secured to spaced portions of the shaft for turning movements about a common axis in unison and in parallel planes, means for moving the matrix in one direction away from the supporting structure, and resilient means acting on the shaft and exerting a restoring force on the levers in opposition to the matrix moving means for moving the matrix in a reverse direction toward the supporting structure.

30. In vulcanizing apparatus for use in retreading tires, a supporting structure, a matrix, means for heating the matrix, and means mounting the matrix for movement toward and away from the supporting structure, said mounting means comprising a pair of shafts journaled on the supporting structure in spaced, generally parallel relation, levers connected between the supporting structure and the matrix, said levers being in pairs with one pair secured to spaced portions of one of the shafts for turning movements in unison and in parallel planes about a common axis and with another pair similarly secured to the other shaft, means for moving the matrix in one direction away from the supporting structure, and resilient means acting on the shaft and exerting a restoring force on the levers in opposition to the matrix moving means for moving the matrix in a reverse direction toward the supporting structure.

31. In vulcanizing apparatus for use in retreading tires, a supporting structure, a matrix, means for heating the matrix, and means mounting the matrix for movement toward and away from the supporting structure, said mounting means comprising a shaft journaled on the supporting structure, companion pairs of toggle links connected between the supporting structure and the matrix, corresponding links of the toggles being secured to spaced portions of the shaft for turning movements about a common axis in unison and in parallel planes, means for moving the matrix in one direction away from the supporting structure, and resilient means acting on the shaft and exerting a restoring force on the toggles in opposition to the matrix moving means for moving the matrix in a reverse direction toward the supporting structure.

32. In vulcanizing apparatus for use in retreading tires, a supporting structure, a matrix, means for heating the matrix, and means mounting the matrix for movement toward and away from the supporting structure, said mounting means comprising a pair of shafts journaled on the supporting structure in spaced, generally parallel relation, companion pairs of toggle links connected between the supporting structure and the matrix, corresponding links of the toggles being secured to the shafts, the links secured to the shafts being in pairs with one pair secured to spaced portions of one of the shafts for turning movements in unison and in parallel planes about a common axis and with another pair similarly secured to the other shaft, the toggles including other corresponding links secured to the matrix for turning about generally parallel axes, and resilient means acting on the shafts and exerting restoring forces on the toggles in opposition to the matrix moving means for moving the matrix in a reverse direction toward the supporting structure.

33. Vulcanizing apparatus of the full circle type for retreading tires, said apparatus including a substantially circular supporting structure and a plurality of segmental matrix members movable toward and away from the center of the circle, a plurality of pairs of toggle links distributed at circumferentially spaced points about the supporting structure and extending between the supporting structure and the matrix members for mounting the latter on the supporting structure, each matrix member being connected to the supporting structure by a plurality of pairs of toggle links, one end of one link of each pair being pivoted on the supporting structure, one end of the other link of each pair being pivoted on a matrix member, and the other ends of the links of each pair being pivoted together in the provision of knuckle joints.

34. Vulcanizing apparatus of the full circle type for retreading tires, said apparatus including a substantially circular supporting structure and a plurality of segmental matrix members movable toward and away from the center of the circle, a plurality of pairs of toggle links distributed at circumferentially spaced points about the supporting structure and extending between the supporting structure and the matrix members for mounting the latter on the supporting structure, each matrix member being connected to the supporting structure by a plurality of pairs of toggle links, one end of one link of each pair being pivoted on the supporting structure, one end of the other link of each pair being pivoted on a matrix member, the other ends of the links of each pair being pivoted together in the provision of knuckle joints, and resilient means associated with at least one of the toggle link pairs connected to each matrix member for biasing the matrix members normally to move away from the center of the circle.

35. In a full circle vulcanizing apparatus for use in retreading tires, an outer supporting structure, a plurality of composite matrix segments disposed within the supporting structure for cooperatively surrounding the road engaging tread periphery of a tire being retreaded, an inflatable member interposed between the supporting structure and the segments for contracting the latter, and means securing the matrix segments on the outer supporting structure and guiding the matrix segments in contacting about a tire, the composite matrix segments each comprising a support segment having a radially inwardly directed face and a heater body disposed radially inwardly of the support segment and of the inwardly directed face of the latter, the heater bodies each having a tread shaping face directed radially inwardly for contact with the tread of a surrounded tire, the guiding means having direct connection with the outer supporting structure and with the support segments for mounting the latter on the supporting structure, means for heating the heater bodies, and means securing the heater bodies to the support segments for facile removal of the heater bodies from the support segments while the latter remain mounted on the outer supporting structure.

36. In a full circle vulcanizing apparatus for use in retreading tires, a supporting ring, a plurality of composite matrix segments disposed within the ring for cooperatively surrounding the road engaging tread periphery of a tire being retreaded, an inflatable member interposed between the ring and the segments for contracting the latter, and means securing the matrix segments on the ring and guiding the matrix segments in contracting about a tire, the composite matrix segments each comprising a support segment having a radially inwardly directed face and a heater body disposed radially inwardly of the support segment and of the inwardly directed face of the latter, the heater bodies each having a tread shaping face directed radially inwardly for contact with the tread of a surrounded tire, the heater bodies each having an outwardly directed face disposed in confronting relation to the inwardly directed face of one of the support segments, spacing means interposed between the support segments and the heater bodies to provide insulating spaces between the confronting faces, the guiding means having direct connection with the ring and with the support segments for mounting the latter on the ring, means for heating the heater bodies, and means securing the heater bodies to the support segments for facile removal of the heater bodies from the support segments while the latter remain mounted on the ring.

37. In a full circle vulcanizing apparatus for use in retreading tires, a supporting structure, a plurality of composite matrix segment assemblies mounted on the structure and cooperatively providing an annular tread curing and shaping mold, and means for guiding and moving the segment assemblies toward and away from the center of the apparatus in closing and opening the apparatus about a tire being retreaded, each matrix segment assembly including an arcuate support member, an arcuate heater secured to the support member of the assembly and formed with a radially inwardly directed tread molding face for shaping the road engaging tread periphery of a tire enclosed in the apparatus, a pair of removable tread shoulder curing segments each formed with a radially inwardly directed tread molding face and each having substantially the same arcuate length as the heater of the matrix assembly, and means securing the shoulder curing segments to the heater in direct heat conducting relation thereto for bodily movement of each matrix assembly as a unit during the closing and opening of the apparatus and for facile removal and replacement of the shoulder curing segments on the heaters while the heaters remain secured to the support members, the means for guiding and moving the segment assemblies including means connecting the arcuate support members to the supporting structure independently of the heaters and the shoulder curing segments to permit removal of the heaters and the shoulder curing segments while the support members remain connected to the supporting structure, and means for supplying heat to the heaters of the matrix segment assemblies while the latter are in tire enclosing position to heat the shoulder curing segments by conduction.

38. In a full circle vulcanizing apparatus for use in retreading tires, a supporting structure, a plurality of composite matrix segment assemblies mounted on the structure and cooperatively providing an annular tread curing and shaping mold, and means for guiding and moving the segment assemblies toward and away from the center of the apparatus in closing and opening the apparatus about the road engaging tread periphery of a tire being retreaded, each matrix segment assembly including an arcuate support member, an arcuate heater secured to the support member of the assembly and formed with a radially inwardly directed tread molding face for shaping the road engaging tread periphery of a tire enclosed in the apparatus, a pair of removable tread shoulder curing segments each formed with a radially inwardly directed tread molding face, the shoulder curing segments being disposed along opposite sides of the heater of the matrix assembly for contacting shoulder portions of a tire during the retreading thereof, the removable shoulder curing segments having radial flanges overlying the sides of the heater, stud means disconnectably attaching the flanges of the shoulder curing segments to the heater to secure the shoulder curing segments to the heater in direct heat conducting relation thereto for bodily movement of each pair of shoulder curing segments in unison with the heater to which such pair is secured during the closing and opening of the apparatus and for facile removal and replacement of the shoulder curing segments from the heater while the latter remains secured to the support member, the means for guiding and moving the matrix segment assemblies including means connecting the arcuate support members to the supporting structure independently of the heaters and the shoulder curing segments to permit removal of the heaters and the shoulder curing segments while the arcuate support members remain connected to the supporting structure, and means for supplying heat to the heaters of the matrix segment assemblies while the latter are in tire enclosing position to heat the removable shoulder curing segments by conduction.

HERMAN T. KRAFT.

REFERENCES CITED

The following references are of record in the file of this patent:

UNITED STATES PATENTS

| Number | Name | Date |
|---|---|---|
| 1,043,665 | Boyd, Sr. | Nov. 5, 1912 |
| 1,382,326 | Sloper | June 21, 1921 |
| 1,976,833 | Brundage | Oct. 16, 1934 |
| 2,024,554 | Vogt | Dec. 17, 1935 |
| 2,228,316 | James | Jan. 14, 1941 |
| 2,266,956 | Brundage | Dec. 23, 1941 |
| 2,313,414 | Wheatley | Mar. 9, 1943 |